United States Patent [19]

Hagemier

[11] Patent Number: 6,003,016

[45] Date of Patent: *Dec. 14, 1999

[54] METHOD OF REFUNDING VALUE ADDED TAX

[75] Inventor: Robert C. Hagemier, Indianapolis, Ind.

[73] Assignee: Va-T-en, L.L.C., Indianapolis, Ind.

[ * ] Notice: This patent is subject to a terminal disclaimer.

[21] Appl. No.: 09/264,440

[22] Filed: Mar. 8, 1999

Related U.S. Application Data

[63] Continuation-in-part of application No. 08/976,106, Nov. 21, 1997, Pat. No. 5,903,876.

[51] Int. Cl.[6] .................................................. G06F 19/00
[52] U.S. Cl. .............................. 705/19; 705/16; 705/31
[58] Field of Search .................................. 705/19, 17, 16, 705/31

[56] References Cited

PUBLICATIONS

Barnes, Marcia "Get the VAT Back, Jack" Forbes. v135, p. 219(2), May 20, 1985.

"Cash VAT Refunds Take Off with EFTS" Unix News p. 61, Nov. 1991.

Munn, Felicity, "Ducking value–added taxes is worth it in Europe" Windsor Star, Final ED, P D6, Apr. 23, 1994.

"VAT Refunds: How to get them" Travel Agent Europe Supplement p. 1, Aug. 26, 1996.

Soares, Christine, "Ireland Instant VAT Refund" Travel & Leisure p. 26, Jul. 1988.

*Primary Examiner*—Allen R. MacDonald
*Assistant Examiner*—Penny Caudle
*Attorney, Agent, or Firm*—Woodard, Emhardt, Naughton, Moriarty & McNett

[57] ABSTRACT

A value added tax card to be used in expediting refund of value added tax on purchases. The method of refunding includes establishing computerized personal accounts and associated value added tax cards. Each personal account and value added tax card has associated therewith the purchaser's name, address, country of residence and passport number. A photograph of the purchaser appears on the value added tax card. The card is presented at the time of purchase to the seller who then sends the credit to the computerized personal account equal to the charged value added tax.

5 Claims, 2 Drawing Sheets

METHOD OF REFUNDING VALUE ADDED TAX

This application is a continuation-in-part of my U.S. patent application Ser. No. 08/976,106, filed Nov. 21, 1997 now U.S. Pat. No. 5,903,876.

BACKGROUND OF THE INVENTION

1. Field of the Invention

This invention is in the field of computerized credit cards and systems for debiting and crediting financial amounts.

2. Description of the Prior Art

Many countries including European countries impose VAT (value added tax) on purchases of goods and services. Foreigners visiting the country imposing the VAT are exempt if the aggregate purchases do not exceed a predetermined amount. The procedure for collection of the VAT from foreigners, particularly tourists, is time consuming and a financial drain on both the foreigner, the retail establishment and the government. The computerized system disclosed herein circumvents many of the problems existing with the present VAT collection method.

Currently E.U. (European Union) countries impose a VAT of 14.89% of the gross purchase price on sales of goods:

Occurring in the E.U.;

To non-E.U. residents; and

Not shipped outside the E.U.

Typically, the non-E.U. resident must separately apply for a VAT refund, either in conjunction with and at the time of the purchase of the goods, or at a separate department maintained by the retailer for such purpose. Generally, the non-E.U. resident must prove that he/she is not an E.U. resident by presenting proof of foreign citizenship at the time the VAT refund application is made. These procedures impose an added personnel and time expense on the E.U. retailer, and require the non-E.U. resident to present proof of foreign citizenship at time of purchase, often by presenting himself/herself at a separate department of the retailer where VAT refund claim forms are processed.

In order to obtain formal VAT credit, the non-E.U. resident must submit the VAT voucher signed by the retailer documenting that the purchaser is a non-E.U. resident to the Customs Authority for certification. The purchased goods must also be available for inspection at the same time. When the form is authenticated by the Customs/Excise officer, the non-E.U. resident may present the form either at a cash refund desk or by mail. The refund may be in cash, or at the purchaser's election, by posted credit to a credit card account. In many cases, the traveler will simply forego obtaining a refund of the VAT due to the time and trouble or not accurately follow the instructions for refund thereby not receiving credit. The current refund process occurs typically at the departing airport where the pressure of international travel and arriving at the departure gate on time is great. In order to successfully receive a refund under the current system, the purchaser must first retrieve the VAT voucher from his or her luggage and then present the voucher to the customs authority at the airport. In many cases, the baggage has previously been checked in to the airline thereby preventing the presentment of the voucher to the customs authority. Even after the voucher has been presented and certified by the customs authority, it is still necessary to go to a separate office to receive the refund. Such procedures are intolerable to the typical tourist. The computerized system disclosed herein eliminates the necessity for visiting both the customs authority and the refund office since the VAT refund is simply posted to the credit card account at the time of purchase.

SUMMARY OF THE INVENTION

One embodiment of the present invention is a method of refunding value added tax on purchases made in a country foreign to the purchaser. A computerized personal account is established having personal data including the purchaser's name, address, country of residence and passport number. A value added tax card is issued to the purchaser having thereon data corresponding to the personal data of the computerized personal account and also having thereon a photograph of the purchaser. The item for purchase in a foreign country is selected and the price of the item determined. The value added tax is calculated on the item. The item is purchased in the foreign country by payment of the price and the value added tax to the seller. The value added tax card is presented to the seller during the purchasing step for refund of the value added tax. A tentative refund credit is created with the value added tax card in the computerized personal account in an amount equal to the value added tax.

It is an object of the present invention to provide a new and improved system for refunding the value added tax.

A further object of the present invention is to provide a system for refunding the value added tax without the necessity of visiting the customs authority and the refund office.

Yet a further object of the present invention is to provide a VAT card to facilitate VAT refunding at the time of purchase of the goods or services.

Related object and advantages of the present invention will be apparent from the following description.

DESCRIPTION OF THE PREFERRED EMBODIMENT

Figure 1:
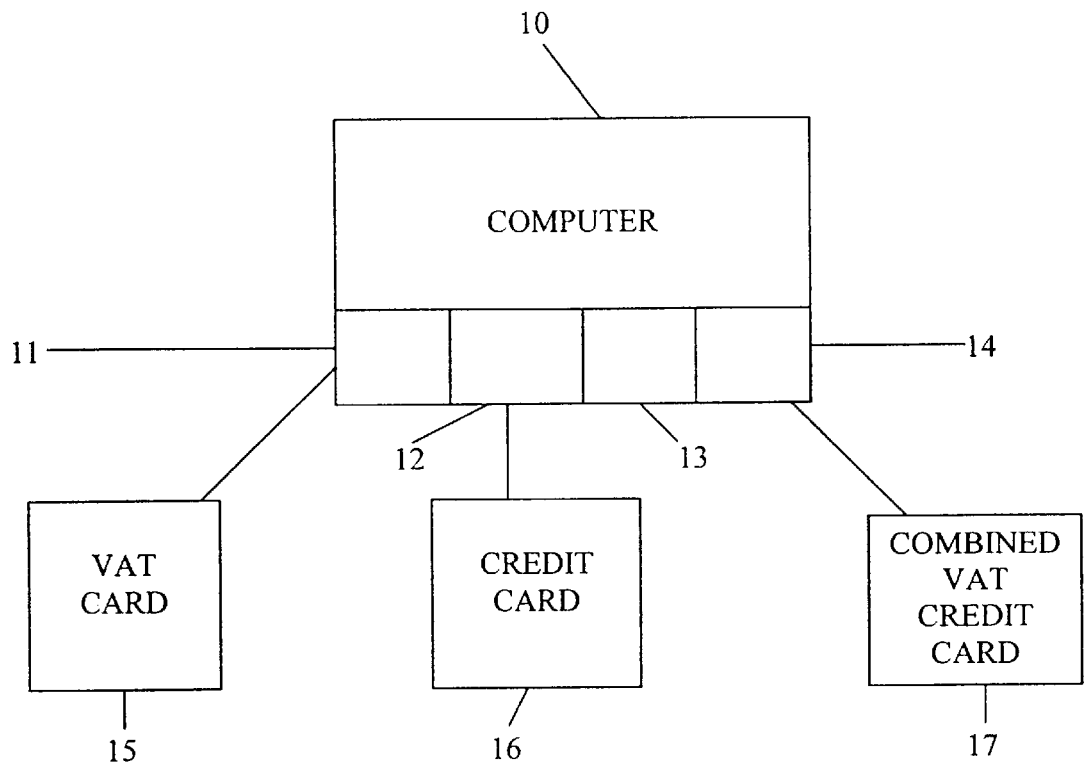
FIG. 1 is a block diagram of a computerized system operable with both a VAT card and a separate credit card and also with a combined VAT credit card.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

In order to simplify the VAT refund procedure, and also to more completely assure the prospect of obtaining the VAT refund at the time of the purchase is made, a specialty card is disclosed herein which: (1) identifies the holder of the card by full name, street address, and non-E.U. country; (2) states the holder's country of residence and passport number and passport expiration date; and (3) identifies the holder by photograph. Referring to the block diagram of FIG. 1, there is shown a computer 10 having a plurality of computerized personal accounts 11, 12, 13, and 14. In reality, the computer 10 would include many thousands of computerized personal accounts. Each account has either a VAT card and credit card or a combined VAT credit card assigned thereto. For example, account 11 has a VAT card 15 and a separate credit card 16 assigned thereto. Both cards 15 and 16 would have on the face thereof the name of the holder, the account number, the expiration date, and the identity of the issuer along with other conventional data typically appearing on a credit card. Account 11 is solely assigned to the holder of cards 15 and 16 in the conventional manner. That is, the prior art credit card systems allow the holder of card 16 to purchase goods and services with a charge then being sent by the retail establishment to the card issuing authority whereby the charge is applied directly to account 11 with the bill eventually being sent from the card issuing authority for account 11 to the holder of card 16. Card 15 is a second card established in addition to card 16 for account 11. Card 15 includes additional information appearing on the face thereof to facilitate the operation of the current method. More specifically, card 15 includes the personal data of the holder's full name, address, country of residence, and passport number and passport expiration date. Further, card 15 includes a photograph of the holder appearing on the face of the card. Alternatively, a combined VAT credit card 17 may be issued corresponding to account 14. Account 14 includes the data of the holder of card 17 in a manner identical to the data included in account 11 for the holder of cards 15 and 16. Likewise, card 17 has appearing on the face thereof the same data for the holder of card 17 as the combined data appearing on cards 15 and 16 for the holder of cards 15 and 16.

The present invention contemplates and includes different embodiments of the cards as related to computer 10. The first embodiment, utilizes a computer 10 having accounts having separate VAT cards and credit cards and also including accounts having only combined VAT credit cards. The second embodiment includes a computer having all accounts each with a separate VAT card and credit card and no combined VAT credit cards. The third embodiment contemplates use of a computer having all accounts assigned only to combined VAT credit cards and not separate VAT cards and credit cards.

Figure 2:
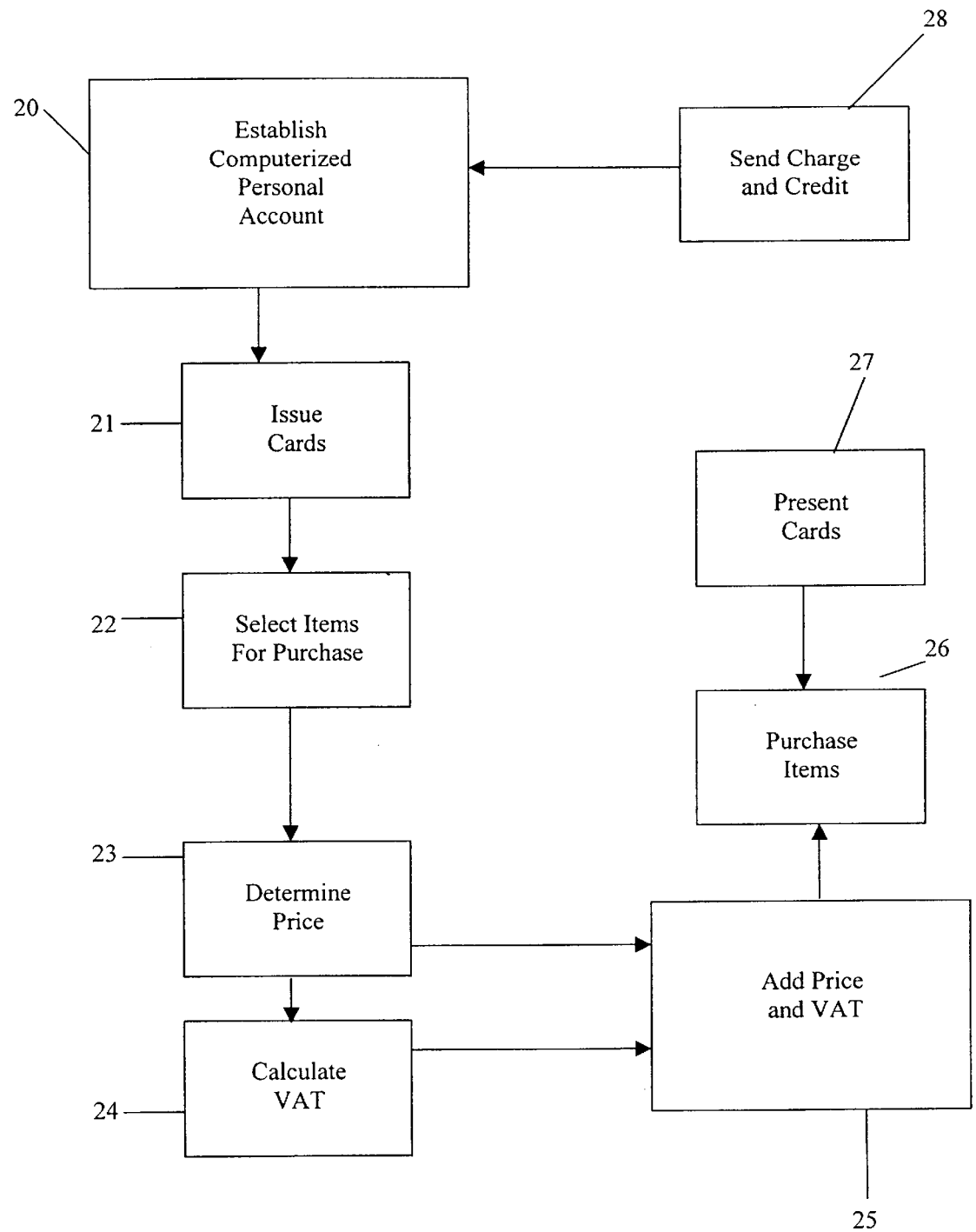
FIG. 2 is block diagram of the steps for performing the method of refunding the value added tax.

The method refunding the VAT on purchases made in the foreign country comprises a plurality of steps. The first step is to establish 20 a computerized personal account (FIG. 2) including the purchaser's name, address, country of residence and passport number. The computer would, as previously described, include a plurality of computerized personal accounts. The method next includes the step of issuing 21 a VAT card to the holder having appearing on the face thereon data corresponding to the personal data contained in computer 10 for the personal account assigned thereto. That is, the issuing authority issues a VAT card having appearing thereon not only the photograph of the holder but also the holder's name, address, country of residence, passport number and passport expiration date. In the case of separate VAT and credit cards, the issuing authority issues a credit card corresponding to the same account as the VAT card. Alternatively, the issuing authority may issue a combined VAT and credit card.

The holder of the VAT card and credit card or of the combined VAT credit card then selects 23 an item or items for purchase. Next, the price of the item or items being purchased is determined 23 and the VAT is calculated 24 for each item and the price and VAT are added 25 together. The VAT is calculated by multiplying the price times the VAT tax percent. Once the selection has been made, along with the determination of the price and calculation of the VAT, the actual purchase 26 of the item or items transpires in the country foreign to the seller by payment of the price and the VAT directly to the seller. By foreign country is meant the country which is foreign to the country of residence of the purchaser and holder of the VAT card but is the country in which the purchase is consummated. When the term holder is used herein it is understood that the purchaser is one and the same person. During the step of purchase, the VAT card 15 is presented 27 to the seller for refund of the VAT. In the event the VAT card 15 is separate from the credit card 16 then the credit card 16 is presented for charging the personal account 11 in an amount equal to the total of the price and the VAT. Simultaneously, the VAT card 15 is presented for crediting the VAT to the personal account 11. In the event a combined VAT credit card 17 is utilized then both the price and the VAT may be charged to the account 14 while at the same time a credit is posted to the account 14 in an amount equal to the VAT, thereby leaving a record of the transaction.

The VAT is refunded assuming the combined purchases do not exceed a predetermined VAT tax level for the particular country. Thus, it is necessary to add together the prices of all items purchased during a particular trip to determine whether the combined prices are below or exceed the predetermined VAT tax level. Computer 10 automatically adds together the purchase price of all items and determines whether the combined prices are below the predetermined level or if they exceed the predetermined level. In the event the combined prices exceed the predetermined VAT tax level, then the excess of the combined prices to the predetermined taxable level is determined, the VAT is calculated on the excess, and the VAT on the excess may be charged to the personal account or deducted from the VAT collected on the purchases not exceeding the VAT tax level. If the combined prices are below the predetermined VAT tax level, then a refund for all VAT taxes collected is issued either as a credit to the personal account or a refund check is issued.

The VAT card or combined VAT credit card is presented to the seller during the purchasing step for a tentative refund of the VAT depending on whether or not the combined prices of all items exceed the VAT tax level of the particular foreign country. Thus, the seller uses the VAT card or combined VAT credit card to send a tentative refund credit to the computerized personal account in an amount equal to the VAT. The tentative refund credit is thereby posted to the computerized personal account.

In order to avoid the added procedure of presenting the VAT voucher to the customs authority, the method contemplates that a non-E.U. purchaser using the pre-approved VAT card will agree to receive a slightly reduced VAT credit posted directly to his or her charge account, that is, 1% or 2% less in refund credit. This is thought to be reasonable consideration for elimination of the customs authority form presentation requirement. The use of a credit card containing the non-E.U. purchasers country of residence passport number and photograph should suffice.

Further, the card applicant will certify that all purchases made with the credit card will:

(1) be deported from the E.U. country within four calendar months from date of purchase; and (2) that the non-E.U. purchaser has not been in the E.U. for more than 365 days in the past two calendar years.

In the event of a determined violation of these conditions, the card holder will agree that the full VAT charges will reapply to the account.

Additional variations of the present invention are contemplated and included herein. For example, the previous embodiments of the method disclosed herein may be modified by establishing a computerized personal account having personal data including the purchaser's name and nation of issuance of the individual's passport. The value added tax card is issued to the purchaser having thereon the data corresponding to the personal data of the computerized personal account, namely, the purchaser's name and nation of issuance of passport. In all other respects, the method is the same as previously disclosed. That is, the method includes not only the step of establishing a computerized personal account and issuing a value added tax card with the aformentioned modification but also the steps of selecting for purchase at least one item in a foreign country, determining the price of the item, calculating the value added tax on the item, purchasing the item in a foreign country from a seller by charging the price and the value added tax, presenting the value added tax card to the seller during the purchasing step for refund of the value added tax and sending by the seller evidence of the purchase through the use of the value added tax card a tentative refund credit through to the computerized personal account in an amount equal to the value added tax. An additional variation includes issuing the value added tax card having thereon image data other than the photograph of the purchaser. That is, any image associated with the purchaser could be utilized, such as, fingerprint information or retina scan information.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A method of refunding value added tax on purchases made in a country foreign to a purchaser comprising the steps of:

establishing a computerized personal account having personal data including the purchaser's name, and nation of issuance of the purchaser's passport number;

issuing a value added tax card to the purchaser having thereon data corresponding to said personal data of said computerized personal account;

selecting for purchase at least one item in a foreign country;

determining the price of said item;

calculating the value added tax on said item;

purchasing said item in a foreign country from a seller by charging said price and said value added tax;

presenting said value added tax card to said seller during said purchasing step for refund of said value added tax; and, sending by said seller evidence of the purchase through use of said value added tax card a tentative refund credit to said computerized personal account in an amount equal to said value added tax.

2. The method of claim 1 and further comprising the additional step of:

posting said tentative refund credit to said computerized personal account.

3. The method of claim 2 and further comprising the additional step of:

issuing a refund check to said purchaser equal to said tentative refund credit.

4. The method of claim 3 and further comprising the additional steps of:

purchasing multiple items in said foreign country during a single visit;

charging said multiple items to said computerized personal account;

presenting said value added tax card during the step of purchasing multiple items;

determining in said computerized personal account the combined prices of said multiple items charged to said computerized personal account;

establishing in said computerized personal account a taxable amount corresponding to said foreign country above which value added tax is to be paid;

determining if said combined prices exceed said taxable amount;

refunding said value added tax on all multiple items if said combined prices are not in excess of said taxable amount and if said combined prices exceed said taxable amount charging an additional value added tax due on the excess of said combined prices exceeding said taxable amount.

5. The method of claim 1 and further comprising the additional step of:

including image data on said tax card.

* * * * *